(No Model.)
J. LIPE.
HOP TRELLIS.
No. 317,385. Patented May 5, 1885.
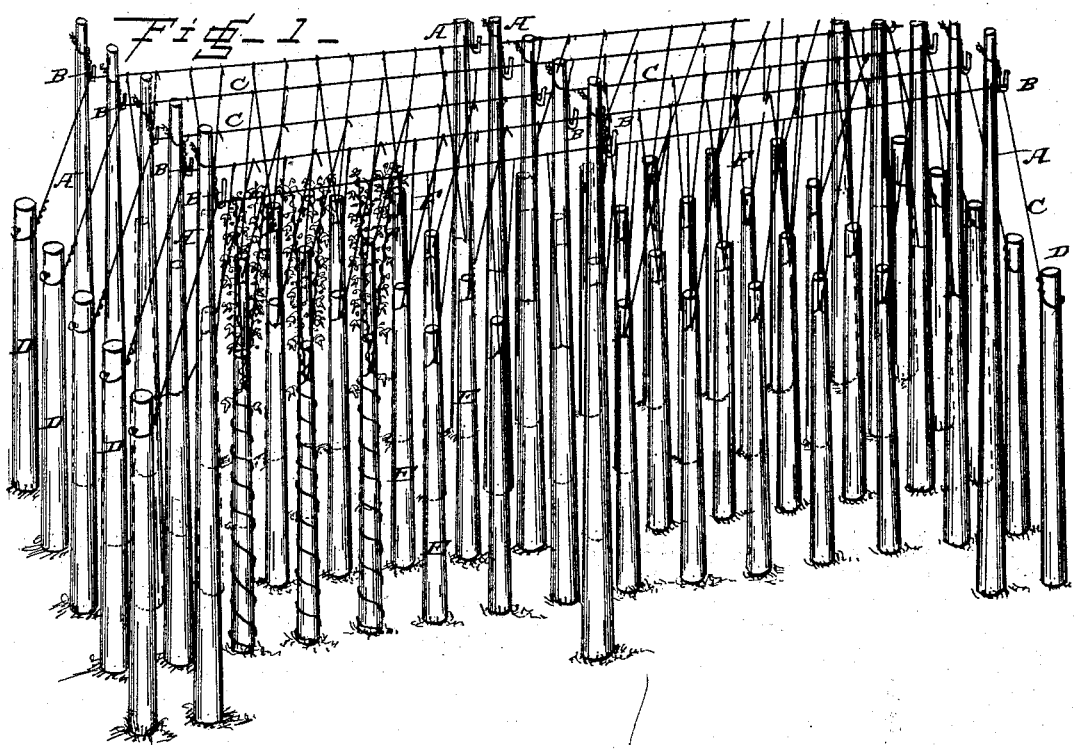
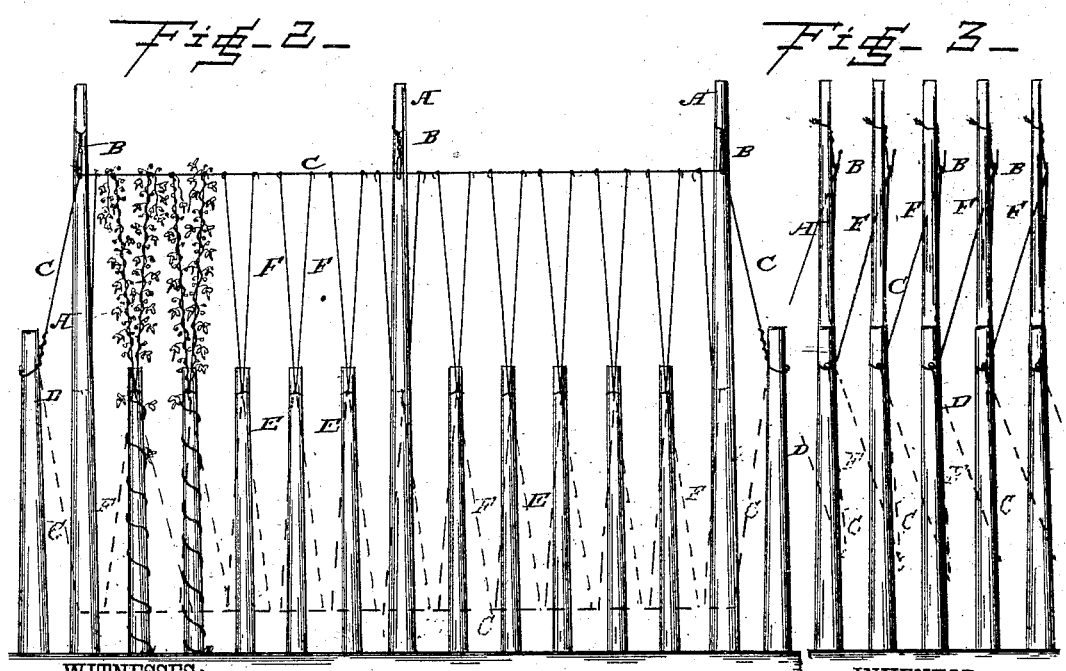
WITNESSES:
Fred. G. Dieterich
Geo. Frech
INVENTOR.
John Lipe,
By Louis Bagger & Co.,
ATTORNEYS.

UNITED STATES PATENT OFFICE.

JOHN LIPE, OF SEWARD, NEW YORK.

HOP-TRELLIS.

SPECIFICATION forming part of Letters Patent No. 317,385, dated May 5, 1885.

Application filed July 19, 1884. (No model.)

*To all whom it may concern:*

Be it known that I, JOHN LIPE, a citizen of the United States, and a resident of Seward, in the county of Schoharie and State of New York, have invented certain new and useful Improvements in Hop-Trellises; and I do hereby declare that the following is a full, clear, and exact desciption of the invention, which will enable others skilled in the art to which it appertains to make and use the same, reference being had to the accompanying drawings, which form a part of this specification, and in which—

Figure 1 is a perspective view of my improved hop-trellis. Fig. 2 is a side view, and Fig. 3 is an end view of the same.

Similar letters of reference indicate corresponding parts in all the figures.

My invention has relation to hop-trellises; and it consists in the improved arrangement of hop-poles, wires, and twines for the vines to climb, as hereinafter more fully described and claimed.

In the accompanying drawings, the letters A indicate long poles arranged in rows, preferably running north and south and at suitable distances apart, and upon the upper ends of these poles are secured hooks B, which support wires C, which are strung along each row of poles suspended upon the hooks and secured at their ends to shorter poles D, secured in the ground near the long poles at the ends of the rows and in line therewith, the said poles being somewhat more than one-half the length of the long poles. A number of shorter poles, L, about half the length of the long poles, are secured in the ground in rows between the longer poles and at the distance apart desired to be between each hill, and two diverging strands, F F, of twine or wire, are secured to the top of each of these short poles and to the wire stretched upon the adjacent row of long poles, preferably the row east of the row from which the twines come, the twines in this manner being extended obliquely.

Each vine is planted at the foot of one of the short poles, or rather the short poles are planted at each hill, and it will be seen that the vines will climb the short poles and the twines, the inclination of the twines giving an increased length of twine for the vines to travel over. It will also be seen that the poles D at the ends of the rows are somewhat more than one-half the length of the long poles, so that when the transverse wires C are unhooked from the hooks B they will slide down upon the side of the long poles and be supported a distance above the ground by the twines connecting them with the end poles, D, and shorter poles E, as shown in dotted lines in Figs. 2 and 3, rendering the bearing portions of the vines accessible to the pickers, while they are supported above the ground so as not to be soiled, and rendering the entire trellis permanent, inasmuch as the twines may be drawn up in position again after having been stripped of the vines by simply raising the ends of the wires and placing them back in the supporting-hooks, when the trellis is ready for the next season's crop.

If more vines are let down by the long wires and the twines than can be picked in one day, the vines may be left perfectly safe in their position for picking, as they are supported above the ground and are in no manner injured, there being no necessity for touching the vines in letting down the wires.

I am aware that it is not broadly new to have twine or wire strands stretched between the tops of poles and having strands of twine or wire extending from shorter poles up to these strands, and I do not wish to claim such construction; but

I claim—

An improved hop-trellis consisting of long poles A, short poles E, and end poles, D, more than half the length of the long poles, wires C, attached to the end poles and detachably secured near the tops of the long poles, and diverging twines or wires F, secured to the short poles and to the wires C of the adjacent rows, as and for the purpose shown and set forth.

In testimony that I claim the foregoing as my own I have hereunto affixed my signature in presence of two witnesses.

JOHN LIPE.

Witnesses:
WM. SECHER,
D. E. MCELHINNY.